United States Patent

Weber et al.

[11] Patent Number: 6,061,002
[45] Date of Patent: May 9, 2000

[54] DEVICE AND METHOD FOR PARKING MOTOR VEHICLE

[75] Inventors: Jens Weber, Kelkheim-Fischbach; Juergen Hoetzel, Michelstadt; Ega Tschiskale, Renningen; Andreas Fehrenbach, Leonberg, all of Germany

[73] Assignee: Robert Bosch GmbH, Stuttgart, Germany

[21] Appl. No.: 08/985,594

[22] Filed: Dec. 5, 1997

[30] Foreign Application Priority Data

Dec. 6, 1996 [DE] Germany ............... 196 50 808

[51] Int. Cl.$^7$ ................................ B60Q 1/48
[52] U.S. Cl. .................. 340/932.2; 340/435; 340/436; 340/903; 180/272; 348/118; 364/443
[58] Field of Search ................ 340/932.2, 901, 340/902, 903, 904, 933, 943, 435, 436, 437, 909; 364/443, 423.098, 578; 180/272, 169, 446; 348/118, 116

[56] References Cited

U.S. PATENT DOCUMENTS

| | | | |
|---|---|---|---|
| 5,285,205 | 2/1994 | White | 340/932.2 |
| 5,587,938 | 12/1996 | Hoetzel | 364/578 |
| 5,646,614 | 7/1997 | Abersfelder et al. | 340/932.2 |
| 5,659,306 | 8/1997 | Bahar | 340/932.2 |
| 5,667,033 | 9/1997 | Shimizu et al. | 340/435 |
| 5,701,122 | 12/1997 | Canedy | 340/932.2 |
| 5,754,123 | 5/1998 | Nashif et al. | 340/903 |

FOREIGN PATENT DOCUMENTS 38 13 083 A1  11/1989  Germany .

*Primary Examiner*—Jeffery A. Hofsass
*Assistant Examiner*—Davetta Woods
*Attorney, Agent, or Firm*—Michael J. Striker

[57] ABSTRACT

A parking device for a motor vehicle has a movement sensor, at least one distance sensor, a control unit, a unit for outputting driving directions, the control unit calculating circular segments for a possible drive path of the motor vehicle in parking space, so that the a unit for outputting driving directions output driving and steering directions optically or acoustically to a driver of the motor vehicle, the control unit being formed so that for a rearward parking the driving and steering directions are provided only for a partial path of a total parking path.

12 Claims, 3 Drawing Sheets

DEVICE AND METHOD FOR PARKING MOTOR VEHICLE

BACKGROUND OF THE INVENTION

The present invention relates to a device and method for parking of motor vehicles.

An automatic parking device for motor vehicle is disclosed for example in the German patent document DE 38 13 083 A1. In this device during a parallel parking with a rearward driving of the vehicle, the steering directions are given to the driver until the vehicle reaches its end position in the parking space. The control system calculates circular arks for the parking process as a driving path, and at the beginning of the parking the steering wheel is turned either left or right until a stop for obtaining a minimal turning circle. In the practice, however, it can be shown that this process is not always satisfactory, since the real turning radii are not known. In addition, there are tolerances caused by tire pressure, tire wear, erroneous track adjustments. Within one series of a vehicle type, there are tolerances of the turning radii which are so great that for a predetermined steering angle the driving path is calculated so inaccurately that the parking result is not always satisfactory.

SUMMARY OF THE INVENTION

Accordingly, it is an object of present invention to provide a parking device for motor vehicle which avoids the disadvantages of the prior art.

In keeping with these objects and with others which will become apparent hereinafter, one feature of present invention resides, briefly stated in a parking device for a motor vehicle, in which the control is performed so that for a rear parking the driving and steering directions are provided only for a partial path of the total parking path.

When the device is designed in accordance with the present invention, the parking process, independently from different turning circles or steering radii, or manufacturing tolerances, can be performed reliably within one vehicle series. Since for a performed parking the beginning of the return along the traveling path on the one circular ark is decisive, it is sufficient when the parking device helps the driver only over a partial path. When the driver successfully drives over a dispartial path, then automatically without difficulties he can bring the parking process to the end without help by a parking device. Vehicle tolerances are corrected in a simple manner by a shorter or longer circular ark by the driver. Unnecessary maneuvering tests during unsuccessful start of the parking process are advantageously avoided.

In accordance with a further feature of present invention, a partial path during a rearward driving in a parking space can be very accurately calculated by the parking device, and a reliable time point can be provided when the driver has to turn the steering wheel in the opposite direction. Advantageously it can be avoided in this case that the parking vehicle approaches the curb edge or another vehicle which limit the parking space.

In order to use relatively small parking spaces, during reversing a complete deviation of the steering wheel is needed, so that the vehicle enters the parking space over a maximum narrow circular ark. The length of the circular ark or segment is a function of the distance from the parking vehicle and the vehicle inner radius under the condition that the rear outer corner of the front vehicle is passed by.

In accordance with the present invention, also an optical or acoustic signal can be provided for alerting the driver of the vehicle about the end of the partial path.

Since during reverse driving the driver not always has a complete visibility, it is advantageous when in accordance with the present invention an actual average distance to the next obstacle is outputted.

In accordance with an especially favorable solution of the present invention, available vehicle devices are utilized, such as for example a distance measuring device which is built in the vehicle. The distance measuring device has all necessary sensors and indicators and can be expanded with a simple programming for assisting the parking so that expensive installation works can be dispensed with. This program is stored preferably in a modular component, so that the available control device is expandable in a simple manner and inexpensively.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
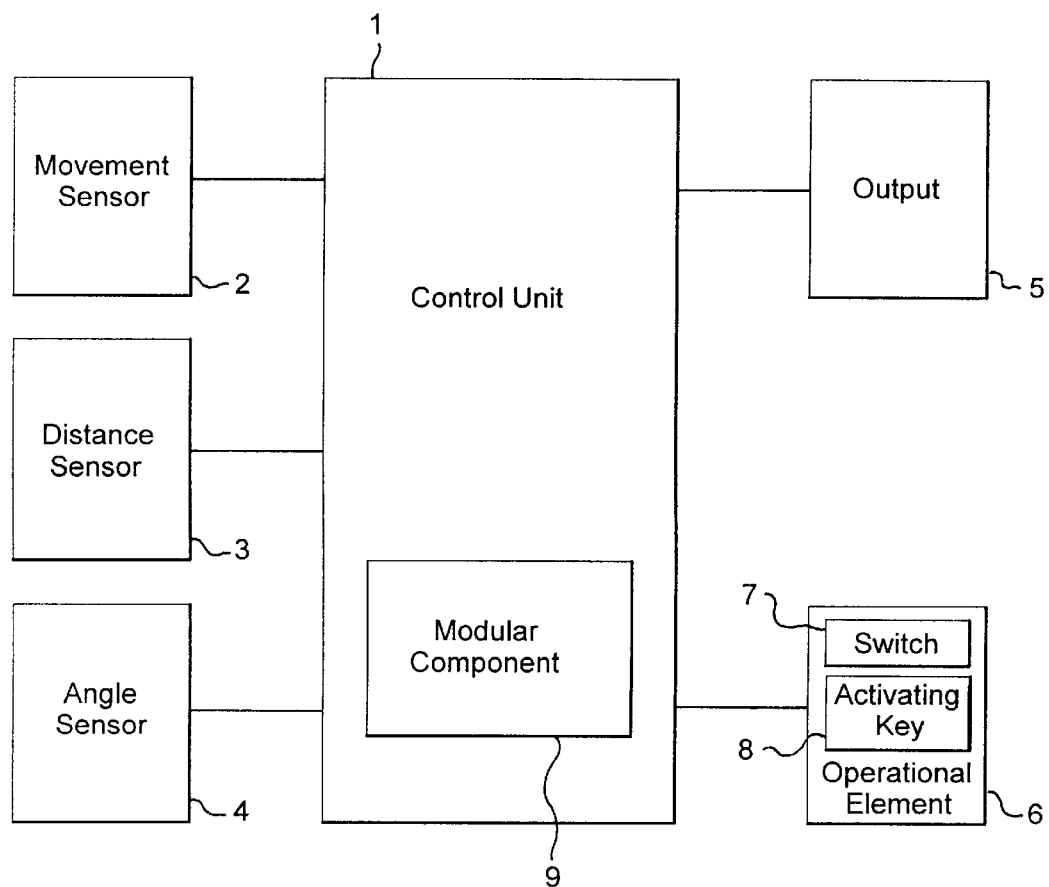
FIG. 1 is a view showing a block diagram of a device for parking of a motor vehicle, in accordance with the present invention.
Figure 4:
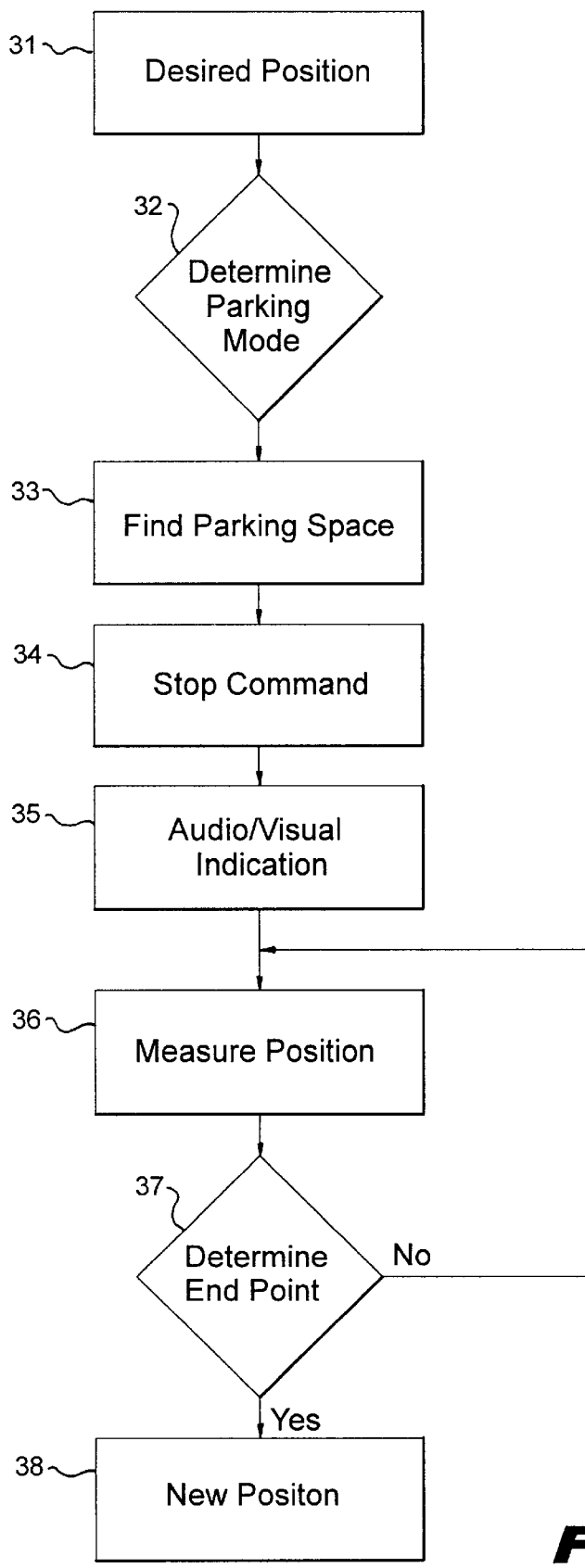
FIG. 4 is a view showing a flow chart of the inventive parking device.

FIG. 1 shows a control unit which is identified with reference numeral 1 and has a microprocessor with several imput and output ports. A memory is provided, in which a corresponding control program is stored. The control unit 1 can be a part of a distance measuring system or a parking assisting device, which is provided with corresponding movement and distance sensors 2 and 3. With such an available device, the inventive device can be equipped with a modular component 9 in which a corresponding control problem is stored, for example as shown in FIG. 4.

At least one movement sensor 2 is connected with the inputs of the control unit 1. The movement sensor is formed for example as a wheel sensor or tacho-transmitter and measures the covered path stroke of the motor vehicle. Furthermore, distance sensors 3 are provided which are arranged at predetermined locations, for example forwardly, rearwardly and laterally of the vehicle. Optionally, an angle sensor 4 can be connected with the input of the control unit 1 for monitoring the steering angle or the driving angle of the motor vehicle. This has the advantage that the outputting of the driving path can be performed in dependence on the position of the steering wheel or the wheels, and any steering stroke can be provided. For activation of the device, operational elements 6 are provided and they can include an activating key 8 and a switch 7 for preselection of a parking mode, for example parking laterally left, laterally right, inclined or perpendicular to the roadway. The individual devices are known from the German patent document DE 38 13 083 A1 and therefore must not be illustrated.

Figure 2:
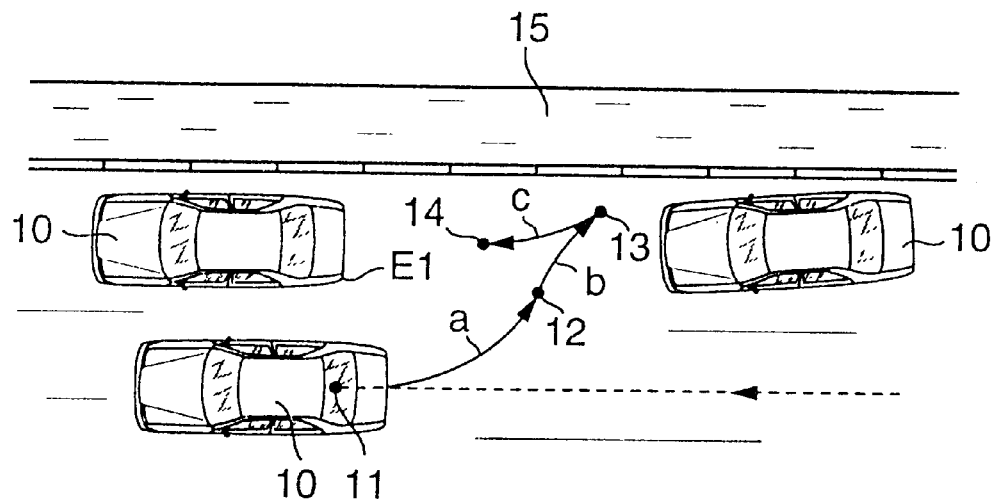
FIGS. 2 and 3 are views showing diagrams with a known and an inventive parking device.

FIG. 2 illustrates how the parking process is performed in accordance with the prior art. When the parking device is activated, the distance sensors arranged on the vehicle measure the length of a parking space during the driving near it. When a sufficiently great parking space is found, the driver of the vehicle releases a stop signal. Then a hint is provided for driving back substantially straight to a reference point 11. The reference point 11 is calculated so that the vehicle with the smallest turning radius can enter the parking space. In the case of the parallel parking at the right side when the reference point 11 is reached, the driver turns the steering wheel to a stop in a clockwise direction and then further drives it back.

As a reference point for the vehicle, preferably the rear axle is taken, and the path curve is calculated for the center of the vehicle. The vehicle drives then over a circular segment "a" rearwardly until it reaches the point 12. At this location the driver is asked to turn the steering wheel in an opposite direction and drive further along the circular segment "b" until it reaches a point 13. After reaching the point 13, the vehicle 10 is driven in a forward direction to a point 13, until it reaches its end position. The circular segment shown in FIG. 2 are not provided in a correct scale, but represent only the substantial driving direction. The end position of the motor vehicle 10 is reached, as shown at the left side of FIG. 2. The ideal parking is provided when a certain safety distance "s" to an obstacle 15, for example a curb edge is obtained.

Figure 3:
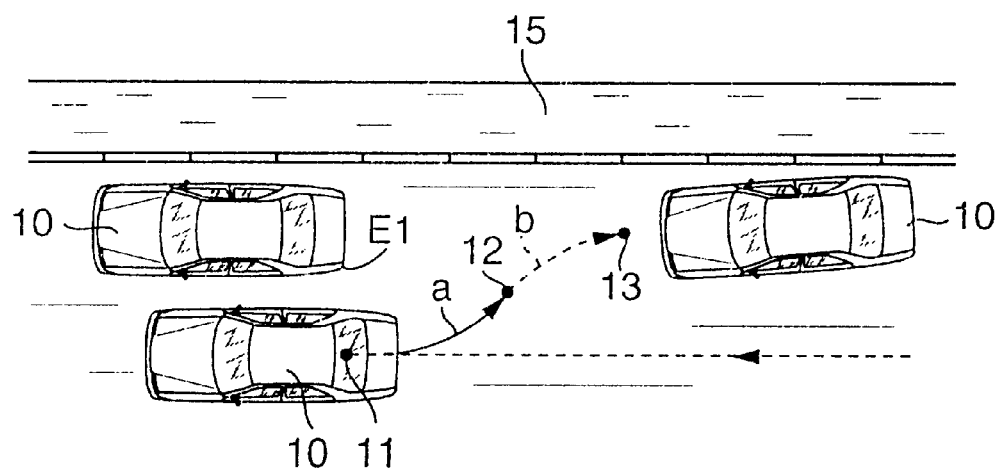

FIG. 3 shows a course of the inventive parking process. The driver of the motor vehicle 10 is guided on the partial path "a" from the reference point 11 to the reference point 12. In the point 12 an optical and/or acoustic output is produced, substantially with the directive that the steering wheel is to be turned in an opposite direction and no further assistance by the parking device will follow. The driver then drives independently from the parking device along the broken line "b" to the point 13 and drives for example by reading of the distances "s" to a next obstacle measured by the distance sensor 3. After reaching the point 13, the driver of the vehicle 10 drives in a forward direction until its end position is reached, as described with reference to FIG. 2, if it is necessary.

In accordance with a further embodiment of the invention, the parking can be performed at any steering angle, since the drive path is calculated in accordance with the actual steering or driving angle. For this purpose an angle sensor 4 is required, which provides an axis for example by the difference signal of two wheel sensors.

It is to be understood that with a sufficiently great parking space the forward driving can be dispensed with when the driver of the motor vehicle 10 already reached the right position to the obstacle 15 during a rearward driving.

The flow chart shown in FIG. 2 illustrates the course of the assistance for the parking process. As can be seen from FIG. 1, the control unit substantially contains a program which computes the driving path and determines steering directions. This program in accordance with a further embodiment of the invention can be utilized as a modular component 9 in an available control unit for the distance measurements during parking.

The operating sequence of this program is as follows:

When a position 31 is desired for parking of the vehicle 10, then the activating key 8 initiates a search for a suitable parking space. Alternatively, it is provided that the parking device continuously searches for a parking space, but outputs only on demand of the next parking space. This has the advantage that in each case, also when the driver forgets to initiate the process, a parking possibility can be proposed.

After the initialization, in the position 32, an inquiry is provided with which parking mode the parking must be performed. If a parking mode is designed in accordance with FIG. 3, then by means of the switch 7 the parking gap selection is performed. The parking gap selection switch 7 can be formed as a rocker or a joy stick or can be combined with the activating key 8, so that for different movement directions of the switch a predetermined parking mode is selectable (position 33). In the position 33 the parking device searches for a suitable parking space, which must have an average length corresponding to the vehicle dimensions and vehicle type. When during a forward travel such a space is found, then the parking device produces a stop command 34 with a hint to move back slowly. Since the parking device, based on the signals of the movement sensor 2, always recognizes the exact position of the vehicle 10 relative to the parking space, it calculates a fictional reference point 11. In the position 35, during reaching the reference point 11 an output 5 is outputted acoustically and/or optically, that the driver must turn the steering wheel preferably until a full stop to the right. The calculation of the drive path is performed so that with the full steering stop, the partial path "a" forms a circular segment for example of a quarter circle. The length of the circular segment is calculated with consideration of a distance of an obstacle and a vehicle radius. Additional conditions can be satisfied in that the rear vehicle corner E1 moves around the front parking vehicle.

If to the contrary, the full steering stroke is not performed, then the control unit calculates in accordance with a position 36 from the data measured by the movement sensor 2, the distance sensors 3 and in some cases the angular sensor 4, a new drive path "a" as well as an associated point 12 which again provides the end of the assisted parking. In the position 37 it is checked whether the end point 12 is reached. If this is not the case, the drive path measurement is performed as described before in the position 36. If the point 12 in accordance with the position 37 is reached, in the position 38 the output is provided that the driver must perform preferably full steering stroke in an opposite direction, and the parking process can be performed with its own control. This partial path "b" to the point 13 shown in a broken line is in practice easy to reach, since the vehicle by the assisted guidance has assumed from the partial path "b" an optimal position relative to the available parking space. An unnecessary reciprocating maneuvering is no longer necessary.

It will be understood that each of the elements described above, or two or more together, may also find a useful application in other types of constructions differing from the types described above.

While the invention has been illustrated and described as embodied in device and method for parking of motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A parking device for a motor vehicle, comprising a movement sensor; at least one distance sensor; a control unit; means for outputting driving directions, said control unit calculating circular segments for a possible drive path of the motor vehicle in a parking space, so that said means for outputting driving directions output driving and steering directions optically or acoustically to a driver of the motor vehicle, said control unit being formed so that for a rearward parking the driving and steering directions are provided only for a partial path of a total parking path.

2. A parking device as defined in claim 1, wherein said control unit is formed so that said partial path corresponds to a drive path after a first steering stroke.

3. A parking device as defined in claim 1, wherein said control unit is formed so that during a complete steering stroke a length of said partial path is a function of a distance from a parked vehicle and a vehicle inner radius of the vehicle which is being parked and is selectable so that the vehicle to be parked drives around a rear outer corner of a parked vehicle.

4. A parking device as defined in claim 1, wherein said control unit is formed so that when an end point of the partial path is reached, a steering directive for an opposite steering in an opposite direction is produced.

5. A parking device as defined in claim 1, wherein said control unit is formed so that during parking an actual distance to an obstacle located in a surrounding area of the vehicle is outputted, whose distance is a smallest one.

6. A parking device as defined in claim 1, wherein said control unit is formed so that said means for outputting drive directions produce a warning signal selected from the group consisting of an optical warning signal, an acoustic warning signal, and both, upon reaching a predetermined average distance to an obstacle.

7. A parking device as defined in claim 1; and further comprising a parking assisting system provided in the vehicle, said control unit being a part of said parking assisting system which is expandable by a program for outputting driving and steering directions.

8. A parking device as defined in claim 7; and further comprising a modular component in which the program is stored.

9. A parking device as defined in claim 8, wherein said modular component stores data for different parking types.

10. A method of parking of a motor vehicle with assistance of a parking device having a movement sensor, at least one distance sensor, at least one control unit, and means for outputting driving directions, the method comprising the steps of computing by the control unit circular segments for a possible drive path of the vehicle in a parking space; outputting driving and steering directions optically or acoustically to a driver of the vehicle; and giving the driving and steering directions by the control unit for a rearward parking only over a partial path of a total parking path.

11. A parking device for a motor vehicle, comprising a movement sensor; at least one distance sensor; a control unit; means for outputting driving directions, said control unit calculating circular segments for a possible drive path of the motor vehicle in parking space, so that said means for outputting driving directions output driving and steering directions optically or acoustically to a driver of the motor vehicle, said control unit being formed so that for a rearward parking the driving and steering directions are provided only for a partial path of a total parking path, said control unit being formed so that the driving and steering directions for the partial path are outputted until the driver of a motor vehicle steers in an opposite direction.

12. A method of parking of a motor vehicle with assistance of a parking device having a movement sensor, at least one distance sensor, at least one control unit, and means for outputting driving directions, the method comprising the steps of computing by the control unit circular segments for a possible drive path of the vehicle in a parking space; outputting driving and steering directions optically or acoustically to a driver of the vehicle; giving the driving and steering directions by the control unit for a rearward parking only over a partial path of the total parking path; and performing said outputting so that the driving and steering directions for the partial path are outputted until a driver of a motor vehicle steers in an opposite direction.

* * * * *